(12) United States Patent
Lord

(10) Patent No.: US 7,736,614 B2
(45) Date of Patent: Jun. 15, 2010

(54) PROCESS FOR REMOVING ALUMINUM AND OTHER METAL CHLORIDES FROM CHLOROSILANES

(75) Inventor: Stephen Michael Lord, Encinitas, CA (US)

(73) Assignee: Lord Ltd., LP, San Diego, CA (US)

( * ) Notice: Subject to any disclaimer, the term of this patent is extended or adjusted under 35 U.S.C. 154(b) by 299 days.

(21) Appl. No.: 12/080,918

(22) Filed: Apr. 7, 2008

(65) Prior Publication Data

US 2009/0250403 A1    Oct. 8, 2009

(51) Int. Cl.
*C01B 33/107* (2006.01)
*B01D 9/02* (2006.01)

(52) U.S. Cl. ............. 423/342; 423/341; 210/714; 210/718; 23/301; 23/305 A

(58) Field of Classification Search .......... 423/341, 423/342; 210/714, 718; 23/301, 305 A
See application file for complete search history.

(56) References Cited

U.S. PATENT DOCUMENTS

| | | | |
|---|---|---|---|
| 3,878,291 A * | 4/1975 | Keller et al. | ......... 423/341 |
| 4,130,632 A * | 12/1978 | Braunsperger et al. | ...... 423/342 |
| 4,676,967 A | 6/1987 | Breneman | |
| 4,743,344 A | 5/1988 | Breneman et al. | |
| 5,066,472 A | 11/1991 | Ruff et al. | |
| 2001/0053339 A1 * | 12/2001 | Kohler et al. | ............ 422/168 |
| 2004/0042949 A1 | 3/2004 | Block et al. | |
| 2004/0047797 A1 | 3/2004 | Block et al. | |
| 2006/0183958 A1 | 8/2006 | Breneman | |
| 2007/0098612 A1 | 5/2007 | Lord | |

FOREIGN PATENT DOCUMENTS

| JP | 2005-029428 | 2/2005 |
|---|---|---|
| WO | WO2006/054325 | 5/2006 |

OTHER PUBLICATIONS

International Search Report and Written Opinion mailed Jul. 15, 2009 for International Application No. PCT/US2009/002000.

\* cited by examiner

*Primary Examiner*—Ngoc-Yen M Nguyen

(57) ABSTRACT

A process for removing aluminum and other metal chlorides from liquid chlorosilanes with the steps of: introducing a source of seed into a source of impure liquid chlorosilanes, initiating the crystallization of aluminum and other metal chlorides on the seed from the liquid chlorosilanes in a first agitated vessel, passing the resulting mixture of liquid and solids through a cooler into a second agitated vessel for additional crystallization, transferring the resulting mixture of liquid and solids into a solids removal device, transferring the liquid with reduced solids content to a further process or vessel and transferring the liquid with high solids content into a waste concentration device, passing the resulting liquid with reduced solids content to a further process or vessel and passing the resultant liquid with very high solids content to a waste storage vessel with agitation.

11 Claims, 2 Drawing Sheets

Schematic of the method

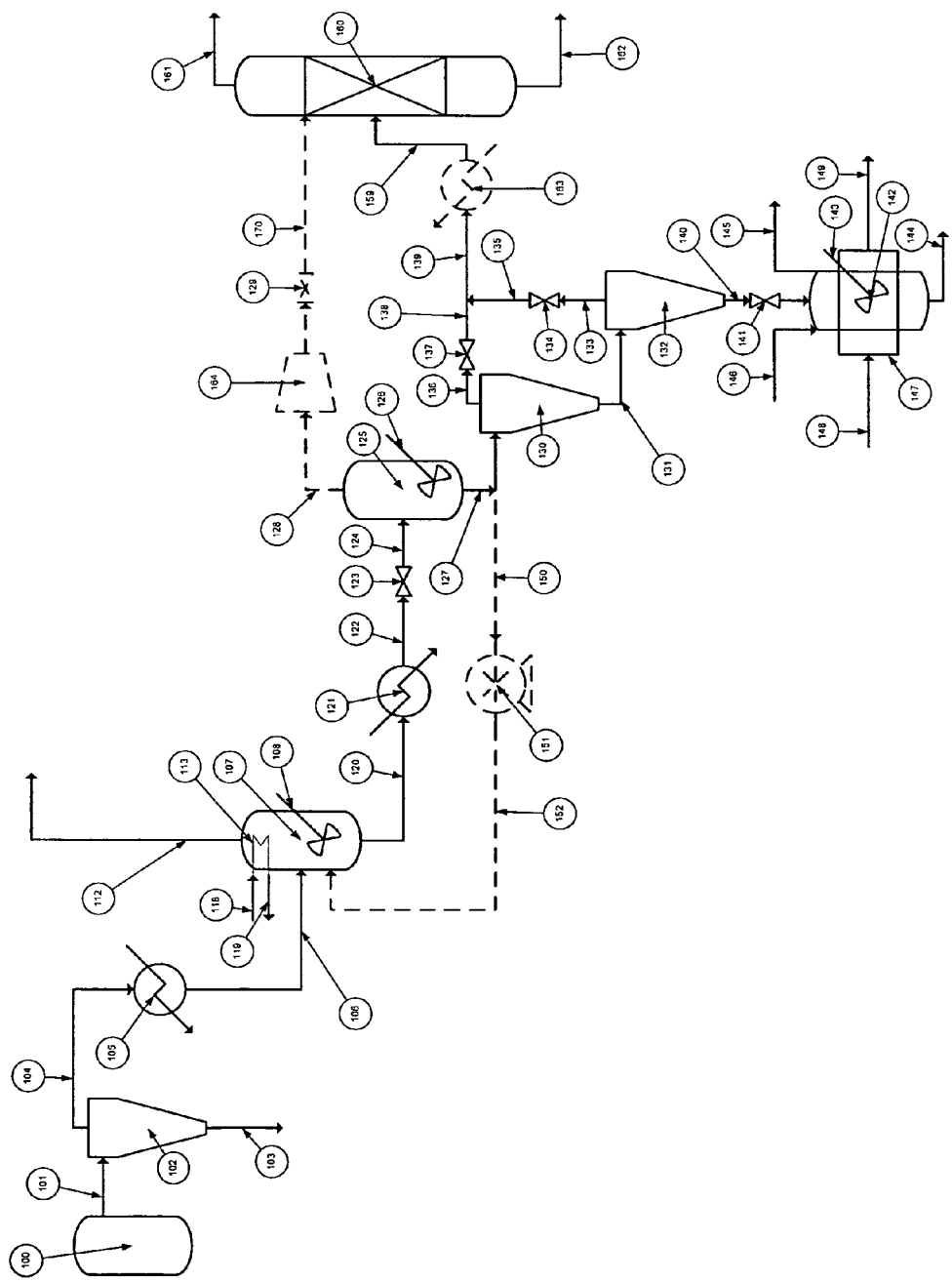
Fig 1. Schematic of the method

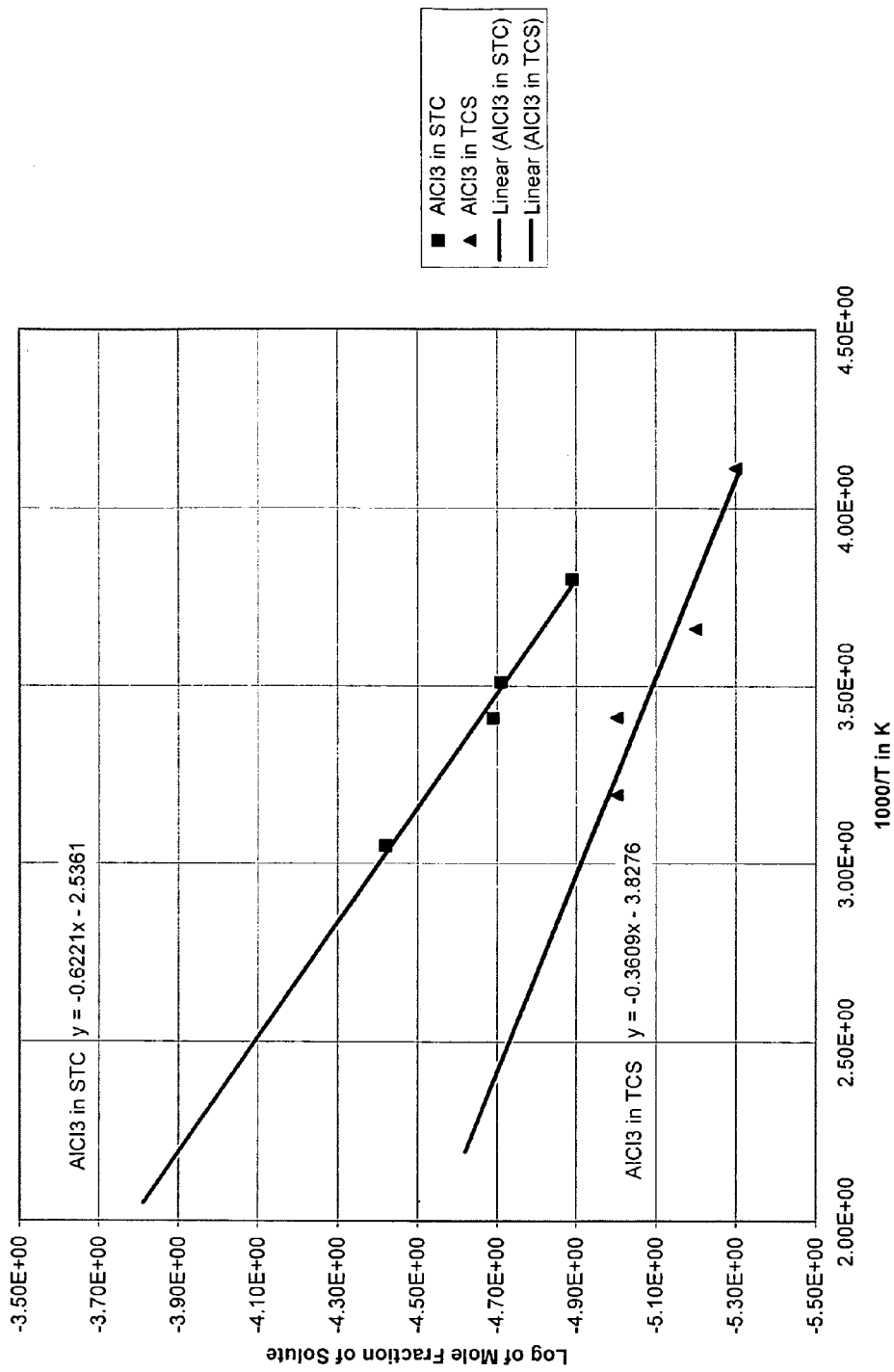
Fig 2. Mole Fraction Solubility of AlCl3 in TCS and STC

PROCESS FOR REMOVING ALUMINUM AND OTHER METAL CHLORIDES FROM CHLOROSILANES

BACKGROUND OF THE INVENTION

This invention relates generally to the field of chlorosilane production and more specifically to a process for removing aluminum and other metal chlorides from chlorosilanes.

In most processes for production of high purity silicon, which is in increasing demand for photo-voltaic devices, the first step is to convert impure, approximately 99% silicon, known as metallurgical grade silicon, MGS, into a liquid chlorosilane, usually trichlorosilane, $SiHCl_3$, which can be purified to very high levels and then converted back to very high purity solid silicon. In this first step, which typically takes place in a fluidized bed reactor, the impure solid silicon is reacted with a chlorine containing gas and many impurities are retained as solids in this reactor or in dust removal equipment such as cyclones. However, the properties of aluminum, and some other contaminants, such as antimony, boron, carbon, indium, gallium phosphorus, thallium, tin, titanium, zinc and zirconium, are such that they form volatile compounds which are carried out of the reactor with the desired chlorosilane. Thus they are present in the effluent gas from the reactor which is then cooled to form a liquid chlorosilane mixture, whose main ingredients are dichlorosilane, $SiH_2Cl_2$, trichlorosilane, $SiHCl_3$, and silicon tetrachloride (also known as tetrachlorosilane), $SiCl_4$, which can be purified by conventional means, primarily distillation. Aluminum is particularly important because it is present in large quantities, 2000-10000 ppma in the metallurgical grade feed stock and, like boron, acts as an electrically active dopant in high purity silicon and so must be reduced to very low levels; boron, however, is only present in the metallurgical grade feed stock at about 20-100 ppma. Furthermore, aluminum chloride, $AlCl_3$, has unusual properties in that it does not form a liquid phase at atmospheric pressure. At close to atmospheric pressures such as would typically be used for distillation, it converts directly from a solid to a gas; it is, however, partially soluble in chlorosilanes dependent on temperature. Thus it is possible to remove aluminum chloride by distillation but very difficult as it tends to form solid deposits within the distillation system and it makes it impossible to directly generate a liquid waste with a high concentration of aluminum, thus requiring disposal of more waste with high economic and environmental impacts. As noted above there are other metals which also form volatile compounds and which are also chlorides. Of these chlorides, most, antimony, indium, gallium, thallium, tin, zinc and zirconium, behave similarly to aluminum and thus tend to be removed with it and one, titanium, does not. Of the remaining elements, boron, carbon and phosphorus, which form volatile compounds, the boron and carbon compounds do not behave like aluminum and must be removed in some other way. The phosphorus compounds also do not behave like aluminum, but certain phosphorus compounds, $PH_3$, $PH_4Cl$, $PCl_5$ and $POCl_3$, can bind with aluminum chloride to form adducts and be removed with the aluminum, and one, PCl3, does not. Adducts are weakly bound mixtures of a Lewis acid and Lewis base and so can form and dissociate readily. This capability of the solid aluminum chloride/phosphine adducts to dissociate is particularly of concern because solids trapped in filters or tanks may release gaseous or dissolved phosphine unexpectedly and cause a spike in phosphorus concentration.

Most prior art patents in chlorosilane production do not mention removing metal chlorides nor do they mention removing phosphorus by binding it to aluminum chloride. In U.S. Pat. No. 4,676,967 by Breneman "High Purity Silane and Silicon Production" the presence of metal chlorides are mentioned as being removed incidentally as part of a waste stream whose primary purpose is the removal of carryover metallurgical silicon powder. Solids are allowed to settle in the bottom of the column and the bottom contents of liquid and solids are periodically blown down to disposal. This is the "only waste stream of the overall integrated process." (Page 5 line 40)

US Patent Application US 2004/0042949 A1 by Block et al. "Method for Removing Aluminum from Chlorosilanes" and Block et al U.S. Pat. No. 6,887,448 "Method of Production of High Purity Silicon"

These inventions use distillation at a temperature greater than 160° C. and high pressure (25-40 bar).

US Patent Application 2007/0098612 A1 by Lord "A Set of Processes for Removing Impurities from a Silicon production Facility"

This application discusses various prior art processes and mentions in passing that a difference between chlorosilane and bromosilane based processes is that in the chlorosilane based process, an additional filtration step is required to remove the solid aluminum chloride.

The deficiencies of the prior art separation technology is also discussed in the prior art technology for processing the wastes that contain the aluminum.

In Ruff, U.S. Pat. No. 5,066,472 page 1 line 28 "The chlorosilanes are usually roughly separated from the solid residues by distillation, leaving as residue a suspension that requires separate processing." He further states on page 1 line 67 "The problem therefore exists of finding a method for processing the distillation residues with the recovery of chlorosilanes . . . ."

As a first step the residue is concentrated by evaporation in a screw dryer.

Similar steps are taken in Breneman U.S. Pat. No. 4,743,344 and in the Breneman patent application US 2006/0183958.

Thus it is clear that a primary deficiency of the prior technology is that the waste stream containing the aluminum contains too much valuable chlorosilanes and considerable energy must be expended to recover this material.

Block, US 2004/0042949 A1, reveals a further deficiency of the prior art distillation separation which is that the aluminum chloride spreads throughout the whole column by sublimation in the gas phase leading to failure to separate the aluminum and to deposition of solid aluminum chloride throughout the column and ultimately to shutdown of the column for cleaning. His invention of high temperature and high pressure (25-40 bar) distillation keeps the aluminum chloride liquid but also has a similar drawback of high energy consumption and high capital cost because of the high pressure. The energy consumption is known to be high because virtually the entire effluent from the reactor is boiled off overhead. Similarly, the capital cost is high because the entire plant effluent must be distilled. A further distillation is still required to separate the desired trichlorosilane from the byproduct silicon tetrachloride.

Lord, US 2007/0098612 A1, does not identify either how to filter the aluminum chloride or, more importantly, how to cause the formation of suitable solids that may be easily filtered. A filtration process also suffers by being a batch process with high capital cost.

Further deficiencies in the prior technology are that there is no mention of the fact that the metal chlorides are less soluble in trichlorosilane than in silicon tetrachloride or that trapped solids containing aluminum chloride may adsorb and release phosphine, $PH_3$, or the other possible phosphorus compounds, $PH_4Cl$, $POCl$, $PCl_5$, which bind to aluminum chloride.

BRIEF SUMMARY OF THE INVENTION

The primary object of the invention is to provide a better way of removing aluminum chloride from chlorosilanes.

Another object of the invention is to remove the aluminum as a solid with other solid contaminants.

Another object of the invention is to remove other volatile metal chlorides commonly present in chlorosilanes which also form solids.

Another object is to remove phosphorus by binding the phosphorus compounds to aluminum chloride and preventing the subsequent release of spikes of the phosphorus compound back into the trichlorosilane.

A further object of the invention is to provide a process with low operating cost.

Yet another object of the invention is to provide a process with low capital cost.

Still yet another object of the invention is to provide a waste stream in a form suitable for recovery of the chlorine content.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a process for removing aluminum and other metal chlorides from liquid chlorosilanes comprising the steps of: providing a processing vessel with agitation means, introducing a seed material and an impure solution of liquid chlorosilanes into the processing vessel, said impure solution of liquid chlorosilanes having aluminum chlorides and other metal chlorides therein maintaining the aluminum chloride and other partially soluble metal chlorides dissolved or suspended in the solution of liquid chlorosilanes while mixing the seed and solution of liquid chlorosilanes to allow deposition of aluminum and metal chloride layers on the seeds, transferring the mixture of seed and solution of liquid chlorosilanes into a solids removal vessel wherein a first stream of high solids content liquid and a second stream of a liquid solution with a reduced solids content is produced;

transferring the second stream of liquid solution with reduced solids content to a further process or vessel and transferring the first stream of high solids content liquid into a waste storage vessel or a further processing vessel.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a flow chart of the operations that comprise the method and its integration into a typical chlorosilane production facility.

FIG. 2 is a chart of the solubility of aluminum trichloride in trichlorosilane (TCS) and silicon tetrachloride (STC).

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Turning first to FIG. 1 there is shown a typical chlorosilane production reactor, 100, which produces an effluent, 101, comprising a mixture of solids and gases including, but not limited to, powdered silicon and other solids, chlorosilanes, hydrogen, hydrogen chloride, aluminum chloride and other metal chlorides. This stream, 101, enters a solid removal means, 102, such as a cyclone or filter system, from which most of the solids are discharged in a stream, 103. However, sufficient solids, which serve as an external source of seeds, remain in a cleaned gas stream, 104. The cleaned gas, 104, is then cooled by a heat removal means, 105, such as a heat exchanger or cooling system, wherein a portion of the cleaned gas stream, 104, is condensed to form a stream, 106, which contains solids, liquids and gases. This stream, 106, then enters an initial gas separator/crystallizer, 107. A gas stream, 112, is cooled in a heat removal system, 113, which has a coolant supply, 118, and a return, 119. The gas stream, 112, now comprising mostly hydrogen and hydrogen chloride, leaves the initial gas separator/crystallizer, 107, to be recycled. The liquids and solids are collected in the bottom of the initial gas separator/crystallizer, 107, where they are mixed by an agitator, 108, to keep the solids suspended in the liquid and to mix in a possible recycle stream, 152, which can provide additional seed if needed. The mixture of liquid and solids in a stream, 120, exits the initial gas separator/crystallizer 107 and enters a further heat removal means, 121, such as a heat exchanger or cooling system, resulting in the formation of a supersaturated solution, 122, and further crystallization on the seeds suspended in the solution, 122. The supersaturated solution, 122, then passes through a control valve, 123, and exits as a lower pressure stream, 124, which enters a second gas separator/crystallizer, 125. Any released gas and vapor, 128, goes overhead, and then through a control valve, 129, which maintains the pressure in the second gas separator/crystallizer, 125. A reduced pressure gas stream, 170, then enters a first chlorosilane distillation column, 160. The liquids and solids entering the second gas separator/crystallizer, 125, are retained in its bottom section and mixed with an agitator, 126. A slurry, 127, leaves the second gas separator/crystallizer, 125, and enters a first solids separation means, such as a liquid cyclone or filter, 130. The majority of the solids exit in a solids stream, 131, together with some liquid chlorosilanes. This stream is then further processed in a second solids separation means, such as a liquid cyclone or filter, 132, to further concentrate the solids in a high solids stream, 140, and additional useful chlorosilanes are recovered in a primarily liquid stream, 133. The high solids stream, 140, is discharged through a valve, 141, directly into a waste tank, 142, which is agitated by an agitator, 143, and heated by a jacket, 147, which in turn has a heating supply, 148, and a return stream, 149. A liquid and solids stream, 144, is sent for disposal or further treatment. A vapor stream, 145, can also be sent for disposal or further treatment. An additional waste stream, 146, is shown entering the tank from elsewhere in the facility.

A recovered liquid chlorosilanes with reduced solids stream, 136, exits the first solid separation means, 130, and passes through a control valve, 137, to form a lower pressure stream, 138. The recovered liquid chlorosilanes with reduced solids stream, 133, exits the second solid separation means, 132, and passes through a control valve, 134, to form a lower pressure stream, 135. Both streams merge to form a liquid feed stream, 139, for the distillation column, 160, which typically operates at 2-10 bar. The purified trichlorosilane, with a typical aluminum concentration of less than 1 ppb, exits in a stream 161, the remaining $AlCl_3$ exits in a bottoms stream, 162, with a typical concentration of 30-100 ppm. The feed stream, 139, may be heated by an optional feed heater, 163, to form a heated stream, 159, prior to entry into the column, 160, as is common distillation practice. It is also possible to recycle some of the slurry from the second gas separator/crystallizer, 125, by the provision of an additional suction line, 150, a pump, 151, and a discharge line, 152. Further modifications are possible to serve the same purposes. For example, a compressor, 164, may be used to reduce the pressure in the second gas separator/crystallizer, 125, and thus cause cooling as the liquid is evaporated; this would also require the use of a pump (not shown) to pressurize the slurry stream, 127. The control valve, 123, may be located in front of the cooling means, 121.

In an example of the application of the process according to FIG. 1, there is shown a mass balance in Table 1. The reactor, 100, operates at 30 bar and the solid removal means, 102, is a cyclone with an efficiency of 96% which produces 0.03 kg/hr of seed in the effluent. The mixture of gas and seed is cooled in a shell and tube heat exchanger, 105, which recovers heat for the process and then enters the initial degasser/crystallizer, 107, which is a pressure vessel with one hour residence time with a magnetic drive agitator, 108. The outlet liquid stream, 120, typically contains impurities in concentrations as shown in Table 2 in addition to the chlorosilanes and methyl chlorosilanes. The heat removal means, 121, is a shell and tube heat exchanger with internally polished or teflon coated tubes to reduce sticking. The outlet temperature is preferably maintained between 40-60° C. to ensure it is below the melting point of the $AlCl_3 \cdot PH_3$ adduct, which is 83° C. The second degasser/crystallizer, 125, is a pressure vessel also of one hour residence time with a lower pressure of 10 bar and is agitated with a similar magnetic drive agitator, 126. It should be noted that both agitators also generate seed by causing impact of the existing seed crystals with the agitator blade, the vessel wall and the seeds themselves. The crystal size distribution can thus be controlled within the preferred size range of 5 to 200 microns. The slurry, 127, is fed to the first solids removal device, 130, which is a liquid cyclone or hydroclone, which uses the liquid pressure to spin the liquid and remove the solids in a manner analogous to the more common gas cyclones. In order to achieve the high efficiency of about 98%, four 1 inch diameter liquid cyclones are manifolded together in a common pressure vessel. Operation is continuous and controlled by the control valves 137 and 134 which adjust the pressure differential and hence the flow splits. Erosion in the cyclones is reduced by use of very hard alumina ceramics on the walls and/or the exit nozzles and provision of easily replaceable wear parts. The second solids removal device, 132, is also a hydroclone but has only one liquid cyclone of ½ inch diameter and a solids accumulator which allows the build up of a high solids concentration (typically 40% by weight) with periodic discharge of the solids, typically every 4-16 hours. The liquid discharge is still continuous even during solids discharge. The waste tank, 142, receives some other waste, 146, which is low in solids but has other impurities such as titanium tetrachloride and boron trichloride. The jacket, 147, is heated by 150 psig steam, 148, and there is a condensate stream, 149. A vapor stream, 145, and liquid/solids stream, 144, are sent for further processing. The waste tank, 142, isolates the solids which can contain the phosphorus adducts and prevents the return of phosphorus to the system even if some phosphorus is released. It can be seen from Table 1 that the solids stream, 140, has only 1 kg/hr of solids. Therefore, even if the hydroclone, 132, is only emptied at the maximum discharge time period, once every 16 hours, the maximum solids content is only 16 kg; thus the chance of a significant phosphorus spike is minimized.

Turning to FIG. 2 it can be seen that the solubilities of aluminum chloride, $AlCl_3$, are fairly linear when the log of the mole fraction is plotted against the reciprocal absolute temperature. It is of importance that the solubility in trichlorosilane (TCS) is one-third to one-quarter of the solubility in silicon tetrachloride (STC). Thus the solubility of $AlCl_3$ is dependent on the temperature and the mole fractions of TCS and STC in the mixture of chlorosilanes. It is important to establish that the $AlCl_3$ stays in solution throughout the distillation column, 160, when fed with the calculated feed concentration of $AlCl_3$. A convenient way to do this is to first use a stage by stage distillation column program, with standard properties for chlorosilane and aluminum chloride based on the assumption that the $AlCl_3$ is dissolved, in order to establish the ideal $AlCl_3$, TCS and STC concentrations at every stage. Second, confirm that the $AlCl_3$ concentration remains below the solubility limit based on temperature and composition. It is important to note that the solid phase $AlCl_3$ exerts its full vapor pressure while the dissolved $AlCl_3$ exerts its vapor pressure based on its concentration multiplied by the full vapor pressure of the liquid $AlCl_3$. A simple check is to ensure that the bottoms stream 162, which contains essentially all the $AlCl_3$ in the column, can keep it in solution. From stream 159 the amount of $AlCl_3$ is 1.35E−3 kg moles and the STC is 28.8 kg moles. This is a concentration of 4.69E−5. The minimum temperature, from the equations in FIG. 2, is as follows.

Molar Solubility in STC=(1.35$E$-3)/28.8=4.69$E$-5

Log of Solubility in STC=−0.6221*(1000/$T$)−2.5361

Log(4.69$E$-5)=−4.33=−0.6221*(1000/$T$)−2.5361

$T$=346.9 K=73.8° C.

Therefore, the minimum temperature of the bottoms stream, 162, is 73.8° C. Thus the tower operating pressure can be set to ensure the bottoms temperature is above this minimum temperature. The pressure in this example is 8 bar and the bottom temperature would be between 140-150° C. which is well above the required temperature. The minimum required pressure would be 1.6 bar assuming 100% STC in the bottoms stream, 162. It will be obvious to one skilled in the art that similar calculations can be performed for other column designs, such as using side draws. A further step is to check that the incoming feed stream, 159, is free of suspended solids. At the feed stream temperature of 81.7° C. (354.85 K) the solubility, from the equations in FIG. 2, is as follows.

The inverse of the temperature 1000/$T$=2.818

Log of Solubility in STC=−0.6221*2.818−2.5361=−4.289

Molar Solubility in STC=10^(−4.289)=5.14$E$-5

Log of Solubility in TCS=−0.3609*2.818−3.8276=−4.845

Molar Solubility in TCS=10^(−4.845)=1.43$E$-5

The further step is to multiply the respective molar solubility by the number of moles of STC and TCS (see Table 1, stream 139), then sum those results to obtain the maximum number of moles of $AlCl_3$ that can be dissolved in the stream.

Kg Moles AlCl3 dissolved in STC=5.14
$E$-5*28.8=1.48$E$-3

Kg Moles AlCl3 dissolved in TCS=1.43
$E$-5*10.8=1.54$E$-4

Maximum Kg Moles AlCl3 dissolved in
mixture=1.634$E$-3

Turning to Table 1, stream 139, there is a suspended $AlCl_3$ content of 2.28 E−4 kg moles and a dissolved $AlCl_3$ content of 1.12E−3 kg moles for a total $AlCl_3$ content of 1.348 E−3 kg moles. The ratio of the maximum $AlCl_3$ dissolved content for composition of stream 139 at 81.7° C., 1.634E−3 kg moles, to actual $AlCl_3$ content in stream 139, 1.348 E−3 kg moles, is 1.21 which provides sufficient driving force to dissolve the very fine particles which have carried through the solids separation devices within the residence time provided by the heater, 163 and the connecting piping to the distillation column, 160. Lower driving forces may be sufficient with longer residence times and vice versa.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

TABLE 1

Mass Balance of the process

| Name | Formula | MW g/mol | Stream Number | | | | | | | |
|---|---|---|---|---|---|---|---|---|---|---|
| | | | 101 | 103 | 104 | 106 | 120 | 112 | 122 | 124 |
| | | | Suspended Solids (kg/h) | | | | | | | |
| | | | 0.75 | 0.72 | 0.03 | 1.20 | 0.86 | 0.00 | 1.05 | 1.05 |
| | | | Temperature (° C.) | | | | | | | |
| | | | 600.00 | 50.00 | 550.00 | 130.00 | 126.10 | 18.30 | 50.00 | 50.00 |
| | | | Pressure (atm) | | | | | | | |
| | | | 25.19 | 1.00 | 24.39 | 24.12 | 24.14 | 24.09 | 23.78 | 10.20 |
| | | | Total mol flow (kmol/h) | | | | | | | |
| | | | 109.72 kmol/h | 0.03 kmol/h | 109.69 kmol/h | 109.69 kmol/h | 40.32 kmol/h | 69.37 kmol/h | 40.32 kmol/h | 40.32 kmol/h |
| Gases/Liquids | | | | | | | | | | |
| H2 | H2 (g) | 2.016 | 6.95E+01 | 0.00E+00 | 6.95E+01 | 6.95E+01 | 7.00E−01 | 6.88E+01 | 7.00E−01 | 7.00E−01 |
| STC | SiCl4 (g) | 169.898 | 2.88E+01 | 0.00E+00 | 2.88E+01 | 6.92E+00 | 0.00E+00 | 2.77E−03 | 0.00E+00 | 0.00E+00 |
| STC (l) | SiCl4 (l) | 169.898 | 0.00E+00 | 0.00E+00 | 0.00E+00 | 2.19E+01 | 2.88E+01 | 0.00E+00 | 2.88E+01 | 2.88E+01 |
| Total STC | SiCl4 (g + l) | 169.898 | 2.88E+01 | 0.00E+00 | 2.88E+01 | 2.88E+01 | 2.88E+01 | 2.77E−03 | 2.88E+01 | 2.88E+01 |
| TCS | SiHCl3 (g) | 135.452 | 1.08E+01 | 0.00E+00 | 1.08E+01 | 4.09E+00 | 0.00E+00 | 7.81E−02 | 0.00E+00 | 0.00E+00 |
| TCS (l) | SiHCl3 (l) | 135.452 | 0.00E+00 | 0.00E+00 | 0.00E+00 | 6.76E+00 | 1.08E+01 | 0.00E+00 | 1.08E+01 | 1.08E+01 |
| Total TCS | SiHCl3 (g + l) | 135.452 | 1.08E+01 | 0.00E+00 | 1.08E+01 | 1.08E+01 | 1.08E+01 | 7.81E−02 | 1.08E+01 | 1.08E+01 |
| | HCl (g) | 36.461 | 5.24E−01 | 0.00E+00 | 5.24E−01 | 5.24E−01 | 1.78E−02 | 5.06E−01 | 1.78E−02 | 1.78E−02 |
| | AlCl3 (g) | 133.341 | 8.74E−03 | 0.00E+00 | 8.74E−03 | 4.37E−04 | 0.00E+00 | 0.00E+00 | 0.00E+00 | 0.00E+00 |
| Solids | | | | | | | | | | |
| | Si | 28.086 | 2.67E−02 | 2.56E−02 | 1.07E−03 | 1.07E−03 | 1.07E−03 | 0.00E+00 | 1.07E−03 | 1.07E−03 |
| | AlCl3 (dissolved) | 133.341 | 0.00E+00 | 0.00E+00 | 0.00E+00 | 8.30E−03 | 2.52E−03 | 0.00E+00 | 1.12E−03 | 1.12E−03 |
| | AlCl3 (suspended) | 133.341 | 0.00E+00 | 0.00E+00 | 0.00E+00 | 0.00E+00 | 6.25E−03 | 0.00E+00 | 7.65E−03 | 7.65E−03 |

| Stream Number | | | | | | |
|---|---|---|---|---|---|---|
| 127 | 136 | 131 | 135 | 140 | 139 | 159 |
| Suspended Solids (kg/h) | | | | | | |
| 1.05 | 0.02 | 1.03 | 0.01 | 1.02 | 0.03 | 0.00 |
| Temperature (° C.) | | | | | | |
| 50.00 | 50.00 | 50.00 | 40.00 | 40.00 | 50.00 | 81.70 |
| Pressure (atm) | | | | | | |
| 10.20 | 9.20 | 9.20 | 8.20 | 5.00 | 8.20 | 8.20 |
| Total mol flow (kmol/h) | | | | | | |
| 40.32 | 35.82 | 4.50 | 4.48 | 0.02 | 40.32 | 40.32 |

TABLE 1-continued

Mass Balance of the process

| Name | Formula | MW g/mol | kmol/h | kmol/h | kmol/h | kmol/h | kmol/h | kmol/h | kmol/h |
|---|---|---|---|---|---|---|---|---|---|
| Gases/Liquids | | | | | | | | | |
| H2 | H2 (g) | 2.016 | 7.00E−01 | 6.22E−01 | 7.80E−02 | 7.79E−02 | 1.74E−04 | 7.00E−01 | 7.00E−01 |
| STC | SiCl4 (g) | 169.898 | 0.00E+00 | 0.00E+00 | 0.00E+00 | 0.00E+00 | 0.00E+00 | 0.00E+00 | 0.00E+00 |
| STC (l) | SiCl4 (l) | 169.898 | 2.88E+01 | 2.56E+01 | 3.21E+00 | 3.21E+00 | 7.18E−03 | 2.88E+01 | 2.88E+01 |
| Total STC | SiCl4 (g + l) | 169.898 | 2.88E+01 | 2.56E+01 | 3.21E+00 | 3.21E+00 | 7.18E−03 | 2.88E+01 | 2.88E+01 |
| TCS | SiHCl3 (g) | 135.452 | 0.00E+00 | 0.00E+00 | 0.00E+00 | 0.00E+00 | 0.00E+00 | 0.00E+00 | 0.00E+00 |
| TCS (l) | SiHCl3 (l) | 135.452 | 1.08E+01 | 9.57E+00 | 1.20E+00 | 1.20E+00 | 2.68E−03 | 1.08E+01 | 1.08E+01 |
| Total TCS | SiHCl3 (g + l) | 135.452 | 1.08E+01 | 9.57E+00 | 1.20E+00 | 1.20E+00 | 2.68E−03 | 1.08E+01 | 1.08E+01 |
| | HCl (g) | 36.461 | 1.78E−02 | 1.59E−02 | 1.99E−03 | 1.98E−03 | 4.44E−06 | 1.78E−02 | 1.78E−02 |
| | AlCl3 (g) | 133.341 | 0.00E+00 | 0.00E+00 | 0.00E+00 | 0.00E+00 | 0.00E+00 | 0.00E+00 | 0.00E+00 |
| Solids | | | | | | | | | |
| | Si | 28.086 | 1.07E−03 | 2.14E−05 | 1.05E−05 | 1.05E−03 | 1.04E−03 | 3.18E−05 | 3.18E−05 |
| | AlCl3 (dissolved) | 133.341 | 1.12E−03 | 9.95E−04 | 1.25E−04 | 1.25E−04 | 2.79E−07 | 1.12E−03 | 1.35E−03 |
| | AlCl3 (suspended) | 133.341 | 7.65E−03 | 1.53E−04 | 7.49E−03 | 7.49E−05 | 7.42E−03 | 2.28E−04 | 0.00E+00 |

TABLE 2

Impurity concentration ranges in liquid stream 120

| Volatile Chloride Name | Removable by Process | Typical ppm Atomic Basis | Min ppm Atomic Basis | Max ppm Atomic Basis |
|---|---|---|---|---|
| Aluminum | Yes | 60 | 10 | 1000 |
| Antimony | Yes | 1.5 | .2 | 20 |
| Boron | No | 6 | 1 | 100 |
| Indium | Yes | 0.4 | .1 | 10 |
| Gallium | Yes | 0.6 | .1 | 10 |
| Phosphorus | Yes* | 0.2 | .05 | 5 |
| Thallium | Yes | 2.5 | .1 | 10 |
| Tin | Yes | 0.4 | .05 | 50** |
| Titanium | No | 11 | 1 | 100 |
| Zinc | Yes | 7.0 | 1 | 100** |
| Zirconium | Yes | 5.6 | 1 | 100 |

*Phosphorus can be removed because certain phosphorus compounds can reversibly bind to the aluminum and other chlorides at near ambient temperatures.
**These may be present in the copper catalyst which is usually added to the metallurgical grade silicon, in which case the concentrations could be higher.

I claimed:

1. A process for removing aluminum chloride and other partially soluble metal chlorides from liquid chlorosilanes comprising the steps of:
   condensing an effluent gas comprising chlorosilanes obtained from a process of producing silicon to form a stream containing gases and an impure solution of liquid chlorosilanes, wherein said impure solution of liquid chlorosilanes contains dissolved and suspended aluminum chlorides and other partially soluble metal chlorides as impurities,
   providing a process vessel with a liquid containing chamber at the bottom of the process vessel,
   providing an agitator in the liquid containing chamber,
   introducing a solid seed material and said stream into the processing vessel,
   removing the gases in said stream from the process vessel and collecting the solid seed material and the impure solution of liquid chlorosilanes in said stream in the liquid containing chamber,
   mixing the solid seed material and the impure solution of liquid chlorosilanes in the liquid containing chamber under conditions to allow deposition of aluminum and metal chloride layers on the solid seed material and to form a slurry,
   transferring the slurry into a solids removal vessel wherein a first stream of high solids content liquid and a second stream of a liquid solution with a reduced solids content are produced;
   transferring the second stream of liquid solution with reduced solids content to a further process or vessel and transferring the first stream of high solids content liquid into a waste storage vessel or a further processing vessel.

2. The process of claim 1 wherein said impure solution of liquid chlorosilanes contains one or more removable partially soluble metal chlorides selected from a first group of compounds consisting of $AlCl_3$, $SbCl_3$, $InCl$, $InCl_2$, $GaCl$, $GaCl_2$, $GaCl_3$, $SnCl_2$, $TlCl$, $ZnCl_2$, and $ZrCl_4$, said partially soluble metal chlorides substantially removed by the process.

3. The process of claim 2 wherein said impure solution of liquid chlorosilanes also contains one or more completely miscible chlorides selected from a group of second compounds consisting of $BCl_3$, $TiCl_4$, and $PCl_3$, said second compounds not substantially removed by the process.

4. The process of claim 2 wherein said impure solution of liquid chlorosilanes also contains one or more removable phosphorus compounds selected from a group of compounds consisting of $PH_3$, $PH_4Cl$, $POCl$ and $PCl_5$, said removable phosphorus compounds substantially removed by binding to the aluminum and other chloride in the process.

5. The process of claim 1 wherein said agitator is a mechanical agitator with a leak tight seal.

6. The process of claim 1 wherein said solids removal vessel is a liquid cyclone.

7. The process of claim 1 wherein said waste storage vessel is a heated vessel having at least one discharge port for vapor and at least one discharge port for solids.

8. The process of claim 1 where one or more of the processing steps are repeated.

9. The process of claim 1 further including the step of dissolving the solids in the second stream of a liquid solution with a reduced solids content by increasing the temperature of that stream.

10. The process of claim 1 wherein the solubility of the aluminum chloride and other partially soluble metal chlorides in the impure solution of liquid chlorosilanes is reduced in the mixing step by reducing the temperature.

11. The process as of claim 1 wherein the solubility of the aluminum chloride and other partially soluble metal chlorides in the impure solution of liquid chlorosilanes is reduced in the mixing step by evaporating the chlorosilanes.

* * * * *